United States Patent [19]

Hamanaka

[11] Patent Number: 4,587,586
[45] Date of Patent: May 6, 1986

[54] DISK POSITIONING MECHANISM FOR FLEXIBLE MAGNETIC DISK DRIVE APPARATUS

[75] Inventor: Kunio Hamanaka, Tokyo, Japan

[73] Assignee: Tokyo Shibaura Denki Kabushiki Kaisha, Kawasaki, Japan

[21] Appl. No.: 481,233

[22] Filed: Apr. 1, 1983

[30] Foreign Application Priority Data

Apr. 5, 1982 [JP] Japan .................................. 57-56269

[51] Int. Cl.⁴ .............................................. G11B 25/04
[52] U.S. Cl. ......................................... 360/99; 360/97
[58] Field of Search ...................................... 360/97–99, 360/86; 369/270, 261

[56] References Cited

U.S. PATENT DOCUMENTS

| | | | |
|---|---|---|---|
| 3,940,793 | 2/1976 | Bleiman | 360/99 |
| 4,024,581 | 5/1977 | Lesca et al. | 360/99 |
| 4,194,224 | 3/1980 | Grapes et al. | 360/97 |
| 4,205,355 | 5/1980 | Hamanaka et al. | 360/99 |
| 4,216,510 | 8/1980 | Manzke et al. | 360/99 |
| 4,405,957 | 9/1983 | Vorbach et al. | 360/99 |
| 4,413,294 | 11/1983 | Beijer | 360/99 |
| 4,415,940 | 11/1983 | Becker | 360/99 |
| 4,420,830 | 12/1983 | Green | 369/261 |
| 4,458,278 | 7/1984 | Maclay et al. | 360/99 |
| 4,466,033 | 8/1984 | Jordan et al. | 360/99 |

Primary Examiner—Stuart N. Hecker
Assistant Examiner—Benjamin Urcia
Attorney, Agent, or Firm—Cushman, Darby and Cushman

[57] ABSTRACT

A flexible magnetic disc drive apparatus which comprises a disc clamper assembly which is operated in interlock with a door to hold a flexible magnetic disc between the disc clamper assembly and spindle, a link mechanism for connecting the disc clamper assembly to the door, wherein the link mechanism comprises a door lever which is rotatably fitted at one end to the housing of the flexible magnetic disc apparatus in the vicinity of the disc clamper assembly, and is connected at the other end to the door and whose intermediate part is provided with a projection, and a clamper hanger which is rotatably fitted at one end to the housing between the door and the projection and is connected at the other end to the clamper hanger, and wherein, when the door is opened, the door lever pushes the clamper hanger upward to lift the disc clamper assembly above the spindle, and, when the door is closed, the clamper hanger is elastically brought downward by the urging force of the plate spring fitted to the door lever to let the disc clamper assembly fall, thereby causing the disc to be held between said clamper hanger and spindle.

1 Claim, 7 Drawing Figures

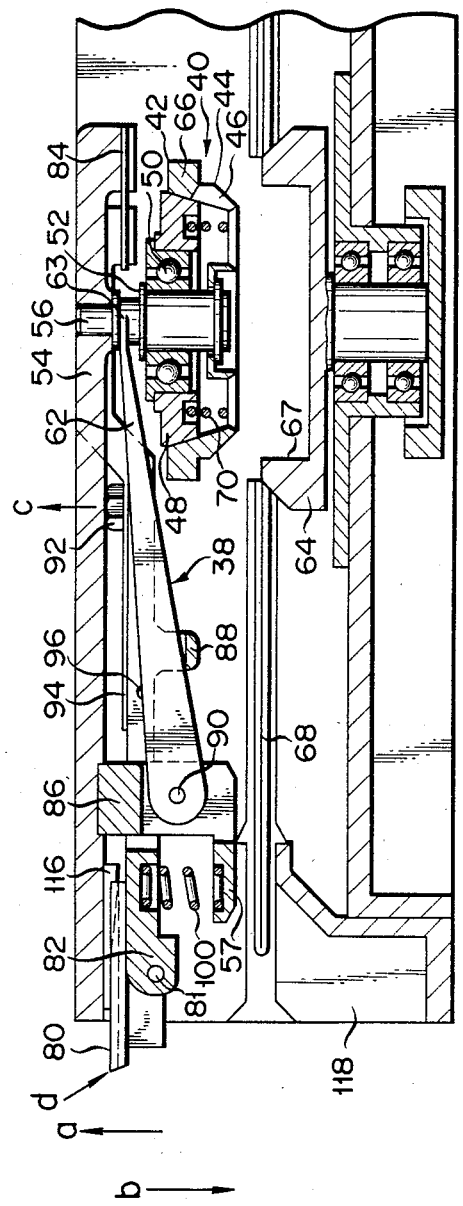

DISK POSITIONING MECHANISM FOR FLEXIBLE MAGNETIC DISK DRIVE APPARATUS

BACKGROUND OF THE INVENTION

This invention relates to a flexible magnetic disc drive apparatus which comprises:

a door;

a disc clamper assembly for holding a flexible magnetic disc bored at the center (hereinafter referred to as "a disc") between the clamper assembly and a spindle;

a link mechanism for causing the door to be moved interlockingly with the clamper assembly and also the flexible magnetic disc to be held by the clamper assembly in accordance with the extent to which the door is moved; and a housing for receiving said door, disc clamper assembly and link mechanism.

Flexible magnetic disc drive apparatuses are now widely accepted. This kind of apparatus has a mechanism allowing for the easy exchange of discs. This exchange mechanism is actuated interlockingly with a door opened or closed by the operator. The inner diameter of the disc is matched with that of a reference hole formed in the spindle and is fitted to the spindle with a prescribed clamping force. The above-mentioned mechanism is indicated in FIGS. 1 and 2. As shown in both figures, a disc 10 is clamped between a spindle 12 and clamper 14. The clamper 14 is rotatably supported and driven with the spindle 12 without mutual displacement due to a frictional force resulting from an axially-applied load. Even if it is initially inserted off-center from the spindle 12, the center of the disc 10 is eventually rendered concentric with the spindle 12 by the tapered portion of the clamper 14. A lever 20 is fitted near the backside 18 of a housing 16 in a state swingable around a pin 22. The left front end of said lever 20 is connected to a door 23. The lever 20 swings around the pin 22 in accordance with the extent to which the door 23 is operated. The clamper 14 is fitted to substantially the midpoint of the lever 20. When moved downward by the swinging of the lever, the clamper 14 is fitted into the reference hole 24 formed in the spindle 12. FIG. 2 indicates the relative positions of the clamper 14, the reference hole 24 of the spindle 12 and the disc 10 inserted into the housing 16, showing that the axis of the disc 10 is slightly displaced from that of the reference hole 24 toward the left side.

Description will now be given of the operation of the conventional flexible magnetic disc drive apparatus. When the door 23 is closed by means of the swinging of the lever 20, then the disc 10 is pushed rightward by the conical inclined plane 28 (with an indicated angle of inclination $\theta$) formed in the lower part of the clamper 14, causing the center of the disc 10 to be aligned with that of the spindle 12. When the clamper 14 is moved further downward, the disc 10 is clamped between the clamper 14 and spindle 12. The total extent to which the clamper 14 is moved during the above-mentioned operation is equal to the sum of its movement for effecting centering between the disc 10 and spindle 12 by means of the descent of the inclined plane 28 and its subsequent movement for ensuring the tight clamping of the disc 10. When the disc 10 is fitted to the subject apparatus, the clamper 14 has to be moved to the above-mentioned extent. Since extensive movement of the clamper 14 enlarges the vertical measurement of the subject apparatus, it is preferred that the clamper 14 be moved as little as possible.

A flexible magnetic disc drive apparatus of the above-mentioned type is now widely accepted. Recently, however, both computers and their supporting hardware have been greatly reduced in size, and so the need to develop a thin and compact flexible magnetic disc drive apparatus has grown. When the industry sought to meet the above-mentioned requirements simply by miniaturizing the conventional magnetic disc drive apparatus of the aforementioned arrangement, the following drawbacks resulted. Since the clamper 14 had to be moved to a smaller extent, the inclination angle $\theta$ shown in FIG. 2 had to be enlarged, resulting in an inaccurate centering between the disc 10 and spindle 12; the edge of the central hole of the disc 10 also tended to be easily damaged; and since the space between the clamper 14 and spindle 12 was narrowed, the disc 10 readily struck against the outer end of the clamper 14. In addition, since a distance n (FIG. 1) between the pin 22 supporting the lever 20 and the point at which the clamper 14 was set in place was narrowed, the clamper 14 descended not linearly, but arcuately around the periphery of an imaginary circle centered at the pin 22;

The inclined plane 28 of the clamper 14 was forcefully fitted into the reference hole 24 of the spindle 12 by being moved obliquely down the inner peripheral wall of said reference hole 24. Difficulties were presented in effecting the clamping of the disc 10 and the centering between the disc 10 and spindle 12, and an attempt to minimize the above-mentioned drawbacks was accompanied by various other difficulties as well.

Studies were made to develop a new magnetic disc drive apparatus in order to eliminate the afore-mentioned drawbacks. With the various proposed magnetic disc drive apparatuses, the lever 20 extends fully from the front end to the rear end of the housing 16 along the central line of a space provided above the housing 16. Noticeable limitations are imposed on the arrangement of devices and members devised for any of the proposed magnetic disc drive apparatuses. To date, therefore, no satisfactory magnetic disc drive apparatus has been realized. The hatching of FIG. 3 indicates the approximate area 23a and 20a occupied by the door 23 and lever 20 as viewed from the top of the conventional flexible magnetic disc apparatus. It can be seen from FIG. 3 that the hatched area is quite large.

SUMMARY OF THE INVENTION

It is accordingly the object of this invention to provide a thin, compact flexible magnetic disc drive apparatus.

To attain this object, this invention provides a flexible magnetic disc drive apparatus wherein a link mechanism is provided with a clamper hanger and door lever;

the clamper hanger is connected at one end to a disc clamper assembly and the other end is rotatably fitted to the housing on that side of the door which faces said disc clamper assembly;

the door lever is swingably fitted at one end to the housing in the proximity of the disc clamper assembly and at the other end is connected to the door;

when the other end of the clamper hanger is pushed upward by the movement of the door, an engageable projection formed on the clamper hanger raises the clamper;

the door level comprises spring means engageable with the clamper hanger; and when the other end of the door level is brought downward by the movement of the door, the spring means forces the one end of the clamper hanger downward, causing the disc clamper assembly to be moved toward one spindle, thereby elastically holding the magnetic disc between the disc clamper assembly and the spindle.

As described above, the link mechanism of the flexible magnetic disc drive apparatus of this invention is provided with a clamper hanger and door lever. The swinging of the door around its axis when it is opened and closed can be carried out to a larger extent than possible with the prior art by means of the lever action of said door lever and clamper hanger, thereby assuring greater movement of the disc clamper assembly. As a result, a magnetic disc can be smoothly and accurately clamped between the disc clamper assembly and spindle without increasing the height of the apparatus.

BRIEF DESCRIPTION OF THE DRAWINGS

FIG. 4 is a fragmentary sectional front view of the opened state of the door of a magnetic disc drive apparatus embodying this invention;

DETAILED DESCRIPTION OF THE PREFERRED EMBODIMENT

Figure 1:
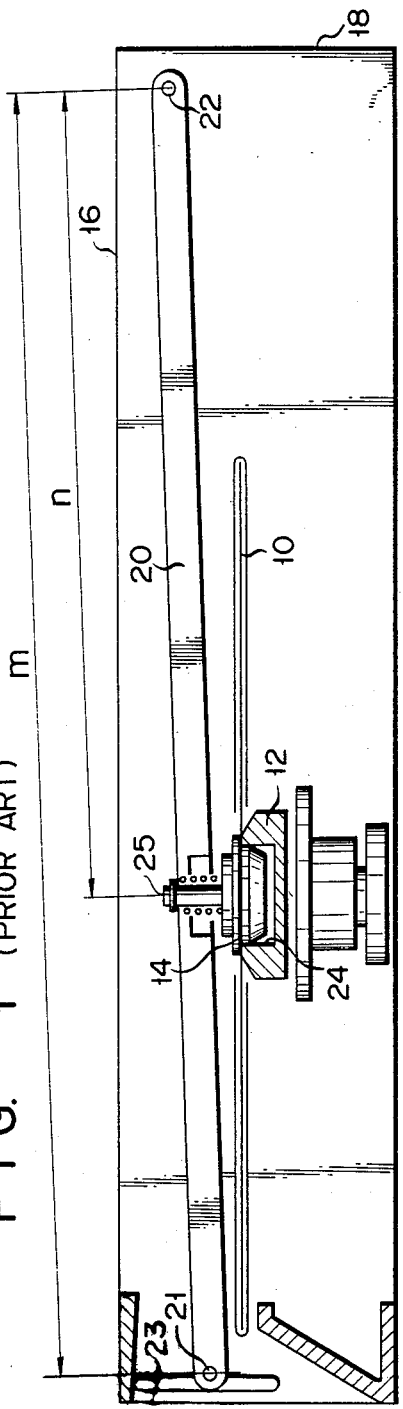
FIG. 1 is a front view of the conventional flexible magnetic disc drive apparatus.

Description will now be given with reference to FIGS. 4, 5 and 6 of a flexible magnetic disc drive apparatus embodying this invention throughout FIGS. 4, 5, and 6, reference numeral 40 denotes a disc clamper assembly. A clamper 42 supported at the lower end of the disc clamper assembly 40 comprises a hollow conical section 44 provided with a plurality of slits 46. When pushed from the inside, the hollow conical section 44 can be elastically expanded. Inside the clamper 42, a conical member 48 engageable with the inclined inner wall of the hollow conical section 44 is fitted to a hollow shaft 52 by means of a ball bearing 50. The outer end of the hollow shaft 52 is fitted to a housing 54 and is engaged with a guide shaft 56 extending downward substantially concentrical with a spindle 64. The hollow shaft 52 can slide vertically together with the ball bearing 50, conical member 48 and clamper 42 (see FIGS. 4 and 5). The hollow shaft 52 is provided with flanges 58, 60 and is driven by the vertical movement of the outer end portion 63 of the clamper hanger 62 projecting into a space defined between the flanges 58, 60. As a result, the upper end face of the spindle 64 is brought into contact with the underside of the flange 66 provided at one upper end of the clamper 42. When the hollow shaft 52 is pulled downward, the hollow conical section 44 of the clamper 42 is elastically expanded by being pushed from the inside by the conical member 48, thereby securely holding the conical member 48. The ball bearing 50 is provided between the hollow shaft 52 and conical member 48. Thus, even while the disc clamper assembly 40 and spindle 64, and the disc 68 clamped therebetween are rotated, the outer end 63 of the clamper hanger 62 and hollow shaft 52 are engaged with each other without mutual sliding, thereby suppressing the occurrence of abrasion and the resultant powders therebetween. Reference numeral 70 of FIG. 4 denotes a coil spring. When the disc clamper assembly 40 is positioned above the spindle 64, said coil spring 70 renders both members concentric with each other. Further, when the clamping member 42 fails to assure a concentric relationship between the disc 68 and spindle 64, then said coil spring 70 serves to cushion the movement of the disc 68.

Figure 5:
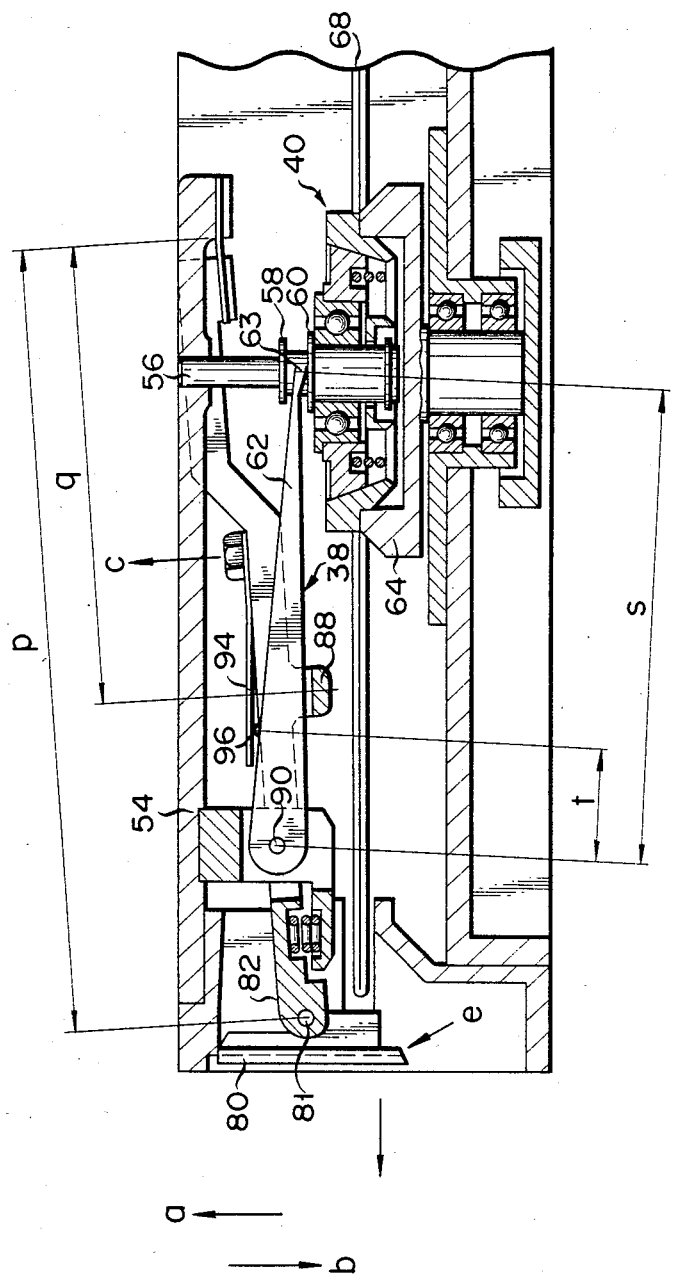
FIG. 5 is a fragmentary sectional front view of the closed state of the door of the magnetic disc drive apparatus of FIG. 4.
Figure 6:
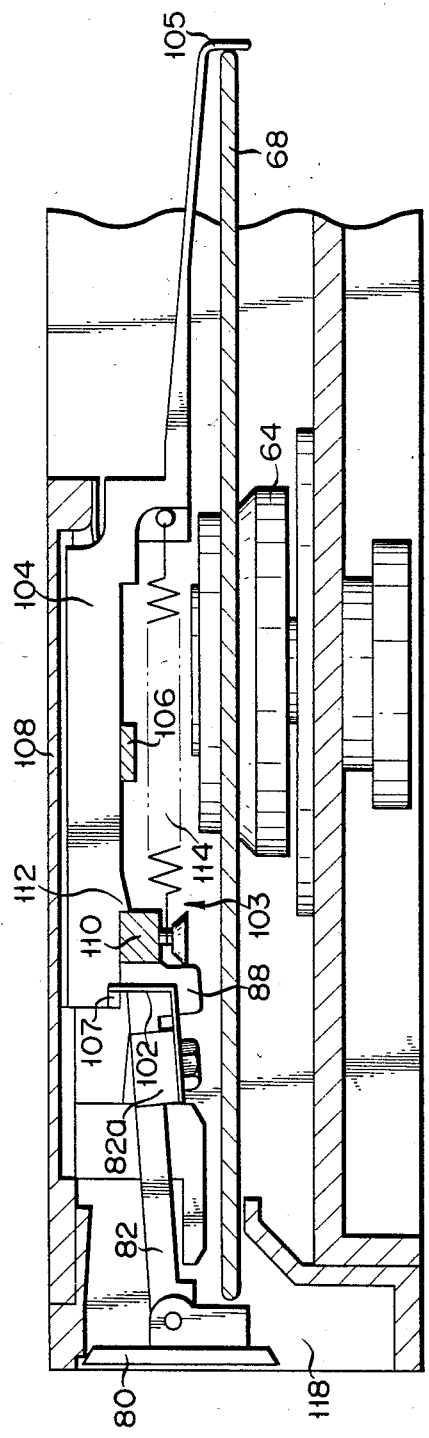
FIG. 6 is a fragmentary sectional front view, of a pop-up mechanism used with the magnetic disc drive apparatus of FIG. 4.

Referring to FIGS. 4 and 5, a door 80 is supported ahead of a door lever 82 in a state rotatable around a pin 81. The door lever 82 extends rearward a little behind the guide shaft 56 of the housing 54 (to the right side of FIGS. 4 and 5), and is fitted to the housing 54 by means of a plate spring 84. The forward end portion of the door lever 82 is so urged by the plate spring 84 as to be moved upward in the direction of arrow a. The left end, that is, the front end of the clamper hanger 62 is fitted to a bracket 86 fixed on the upper wall of the housing 54 close behind the door 80 and door level 82 in a state rotatable around a pin 90. The door lever 82 comprises a projection 88 protruding from the underside of the door lever 82 such that it passes crosswise under the clamper hanger 62. When the door 80 is in a substantially horizontal position, as shown in FIG. 4, the door lever 82 is set to be approximately horizontal; and the clamper hanger 62 is pushed upward by the rising of the aforesaid projection 88, and is rotated counterclockwise around the pin 90, causing the disc clamper assembly 40 to be lifted. When the door 80 is closed, that is, when it is in a substantially vertical position, as shown in FIG. 5, the door lever 82 is rotated counterclockwise around its right end supported on the housing 54. A plate spring 94 whose right end is fixed by a screw 92 and extends leftward is fitted to the upper side of the door lever 82. The left end portion of the plate spring 94 extends over the clamper hanger 62 to push the pressed point 96 of the clamper hanger 62 downward. As a result, the clamper hanger 62 receives a downward acting force (applied in the direction of arrow b in FIG. 4) at this pressed point 96. The clamper hanger 62 is rotated clockwise around the pin 90 by the above-mentioned force. The outer end 63 of said clamper hanger 62 pushes the disc clamper assembly 40 downward. The disc 68 is clamped between the upper face of the spindle 64 and the flange 66 of the clamp member 42.

A coil spring 100 shown in FIGS. 4 and 5 is inserted between the forward portion 57 of the bracket 86 and door lever 82, urging the door lever 82 to rotate clockwise. This urging force supplements the action of the plate spring 84, enabling the door 80 and door lever 82 to be stably operated by the application of a light external force. An L-shaped plate spring 102, which is fitted to a projection 82a protruding from the door lever 82 toward the viewer in FIG. 6, extends first horizonally to the right side of FIG. 6 and then rises upward. A pop-up mechanism 103 extending rightward and leftward in FIG. 6 is provided at a point spaced apart from the clamper hanger 62 of FIG. 4 toward the viewer in FIG. 6. The pop-up mechanism 103 is provided with a horizontally movable pop-up member 104. This pop-up member 104 is horizontally moved by a guide frame 106 fixed to the inner wall of the housing 54 and a shelf portion 108 formed in the upper part of the housing 54. A distance between said shelf portion 108 and guide frame 106 is made slightly larger than the width of the pop-up member 104. When it is pushed upward at the left end, therefore, this pop-up member 104 is slightly rotated clockwise. The housing 54 is provided with a pillar member 110 projecting toward the viewer in FIG. 6. A triangular projection 112 is provided on a substantially horizontal plane of the underside of the pop-up member 104 to be engaged with the right side of the pillar member 110. A coil spring 114 is fitted between the upper end of the pillar member 110 and pop-up member 104 so as to urge the pop-up member 104 leftward. When the right end of the pop-up member 104 is pushed by the disc inserted from the left side of FIG. 4 toward the right side against the urging force of the coil spring 114, and the right upper corner of the pillar member 110 is engaged with the triangular projection 112 of the pop-up member 104, then said pop-up member 104 is immediately latched as shown in FIG. 6 and prevented from being drawn leftward by the force of the coil spring 114. At this time, the end of the upper projecting portion of the L-shaped plate spring 102 protrudes into a notch 107 formed at the left end of the pop-up member 104. When the door 80 begins to be opened and immediately before the upward swing of the door lever 82 is brought to an end, namely, when a gap is produced between the outer end of the clamp member 42 and the upper end face of the spindle 64 to allow for the leftward passage of the disc 68, the upper end of the L-shaped plate spring 102 pushes up the underside of the pop-up member 104, thereby disengaging the triangular projection 112 of the pop-up member 104 from the pillar member 110. As a result, the pop-up member 104 is moved leftward by the force of the coil spring 114, and the disc 68 is pushed toward an opening 118 of the housing 54 by the rear end portion 105 of the pop-up member 104. At this time, the plate spring 102 slides over the underside of the pop-up member 104 in a leftward-bent state.

Description will now be given, with reference to the accompanying drawings, of a flexible magnetic disc drive apparatus embodying this invention. When opened to allow for the insertion of the disc 68 into the magnetic disc drive apparatus, the door 80 comes to a horizontal position as shown in FIG. 4 by being fully rotated clockwise. In this case, the door lever 82 swings counterclockwise in the direction of arrow c, as indicated in FIG. 4, due to the action of the coil spring 100 and plate spring 84, thereby causing the door 80 to be pressed against the guide member 116 and thus be securely held in a horizontal position. At this time, a sufficiently wide space is formed between the lower end of the clamp member 42 and the upper end face of the spindle 64 to allow for the insertion of the disc 68. The pop-up member 104 is moved leftward, that is, to the front side of the apparatus by the action of the coil spring 114. The disc 68 is inserted by the operator in a substantially horizontal manner from the front opening 118 to be engaged with the rear end portion 105 of the pop-up member 104. Thereafter, the coil spring 114 is horizontally extended to cause the disc 68 to be inserted up to a stopper (not shown) formed on the disc guide member 120. At this time, the pop-up member 104 is latched by the pillar member 110 engaged with the projection 112. As a result, the disc 68 is set in a position approximately concentric with the spindle 24 in a state freed from the urging force of the coil spring 114. When the disc 68 is fully inserted, the door 80 is rotated counterclockwise due to its lower end being pushed in the direction of arrow d (indicated in FIG. 4). The upper end of the door 80 is moved leftward along the guide member 116. The door-pivoting pin 81 is moved downward, causing the door lever 82 to swing in the direction of arrow b (in FIG. 4) in which the forward end of the door lever 82 is brought downward. As a result, the projection 88 of the door lever 82 is released downward from the clamper hanger 62, causing the clamper hanger 62 to be rotated clockwise around the pin 90 by the force of the plate spring 94 fitted to the door lever 82, and consequently, causing the forward end of the clamper hanger 62 to be brought downward. Accordingly, the clamper hanger 62 presses the hollow shaft 52 downward, causing the disc clamper assembly 40 to be moved straight toward the spindle 64 along the guide shaft 56. At this time, the clamper hanger 62 acts as a lever which rotates around the pin 90 with a force applied to the pressed point 96 of said clamper hanger 62. Therefore, the disc clamper assembly 40 is moved to a greater extent than the pressed point 96. When the disc 68 is not brought to a concentric state with the spindle 64, the above-mentioned movement of the disc clamper assembly 40 causes the conical section 44 of the clamp member 42 to push the edge of the central hole of the disc 68. As a result, the disc 68 is moved concentrically with the spindle 64. The movement of the disc 68 continues until, as shown in FIG. 5, the conical section 44 of the clamper member 42 is received in the reference hole 67 (FIG. 4) of the spindle 64. At this time, the disc 68 is approximately fixed in place. When the disc clamper assembly 40 is further pressed downward, the underside of the flange 66 of the clamp member 42 contacts the peripheral edge of the central hole of the disc 68, thereby stopping the descent of the disc clamper assembly 40. When the conical member 48 and the conical section of the clamper member 42 which are provided with a plurality of slits 46 are forcefully expanded to be brought into contact with the inner peripheral wall of the reference hole 67, the disc 68 is finally fixed in place. Under this condition, the spindle 64, clamp member 42 and conical member 48 are all joined together, thereby stopping the movement of the disc clamper assembly 40, and consequently, the rotation of the clamper hanger 62 around the pin 90. After the above-mentioned operation, the door 80 is further rotated, causing the pin 81 to be brought further downward and, consequently, the forward end of the door lever 82 to swing further downward in the direction of arrow b. This swinging causes the plate spring 94 fitted to the door lever 82 to apply a downward-acting force to the pressed point 96 of the clamper hanger 62, thereby effecting the depression of the disc clamper assembly 40. This depressing force is transmitted to the spindle 64 through the disc 68. As a result, the disc 68 is tightly held between the disc clamper assembly 40 and spindle 64 concentric with said spindle 64.

With the magnetic disc drive apparatus of this invention arranged as described above, only a small force is applied to counteract the movement of the disc clamper assembly 40, until the disc 68 is finally fixed in place. Since the disc 68 itself can move freely, only a small force has to be applied to the disc clamper assembly 40 to effect centering between the disc 68 and the guide shaft 56, thereby preventing an unduly great force from being applied to the disc 68. After the above-mentioned centering is brought to an end, a sufficient force is applied to the door 80 to effect its complete closure. Since, at this time, the disc clamper assembly 40 is already pressed against the spindle 64 through the disc 68, the force applied to the door 80 is also transmitted to the clamper hanger 62 by means of the plate spring 94 to ensure the complete closure of the door 80. The above-mentioned force causes the disc 68 to be tightly held between the spindle 64 and disc clamper assembly 40. Consequently, no excess force is applied to the peripheral edge of the central hole of the disc 68 in the process of being centered, nor is the edge subject to abrasion or chipping. After being completely centered, therefore, the disc 68 is advantageously held with a great force.

The magnetic disc drive apparatus is provided with a mechanism which keeps the door 80 in an open or closed state as need demands. No description is given of this mechanism, as it is already well known and falls outside the object and scope of this invention.

When the disc 68 is taken out of the subject apparatus, the aforementioned lock mechanism (not shown) is first released to open the door 80. To this end, it is advisable to move the lower end of the door 80 in the direction of arrow e indicated in FIG. 5. Since the door 80 is pushed upward by means of the coil spring 100, the upper end of the door is shifted rightward while being guided by the guide member 116. The door 80 is moved upward as a whole, while being rotated around the pin 81. As a result, the door lever 82 is rotated in the counterclockwise direction in FIG. 4 by the action of the coil spring 100 and plate spring 84. As a result, the clamper hanger 62 is pushed upward by means of the projection 88, and the disc clamper assembly 40 is moved above the spindle 64. Since the displacement of the door lever 82 is effected to a great extent by the clamper hanger 62 acting as a lever, the disc clamper assembly 40 can move through a sufficiently long distance. When the door lever 82 is moved as described above, the L-shaped plate spring 102 of FIG. 6 rises with the door lever 82. The upper end of the plate spring 102 pushes up the left end of the pop-up member 104, thereby releasing engagement between the projection 112 of the pop-up member 104 and pillar member 110. The pop-up member 104 is moved leftward by the action of the coil spring 110. The leftward movement of the pop-up member 104 leads to the leftward movement of the disc 68, thereby enabling the operator to easily take the disc 68 out of the apparatus. The magnetic disc drive apparatus of this invention is so designed that the release of the pop-up member 104 from the latched state by the plate spring 102 is effected only when a sufficiently wide space is produced between the lower end of the clamp member 42 and the upper end of the spindle 64 to allow for the safe removal of the disc 68. The reason for this is that if the disc 68 happens to be moved while an insufficient space still remains between the lower end of the clamper member 42 and the upper end of the spindle 64, then the disc 68 is likely to be damaged.

As described above, the movement of the door-pivoting pin 81 is transmitted to the pressed point 96 of the clamper hanger 62 by the action of the projection 88 of the door lever 82, acting as a lever (hereinafter referred of as "a first lever"). As already described, the movement of the pressed point 96 is transmitted to the disc clamper assembly 40 through the forward end 63 of the clamper hanger 62 acting as a lever (hereinafter referred to as "a second lever") pivoted by the pin 90. In contrast, the conventional magnetic disc drive apparatus of FIG. 1 is so arranged that the clamper 14 is vertically moved by converting the rotation of the door into the movement of an engagement point 25 between a lever pivoted by the pin 22 and clamper 14.

Comparison will now be made between a magnetic disc drive apparatus of the prior art and that of the present invention. Now let it be assumed in the conventional magnetic disc drive apparatus that m denotes a distance between the pin 21 pivoting the door 23 and the pin 22 pivoting the lever 20; and n represents a distance between the engagement point 25 of the lever 20 with the clamper 14 and the aforesaid pin 22. Then the ratio between the extent of movement of the engagement point 25 and that of the pin 21 of the door 23 is equal to the ratio between the lengths m and n given in FIG. 1 (that is n/m≅0.62). The value of this ratio, that is, 0.62 was arrived at by the actual measurement of the numerator n (≅87 mm) and that of the denominator m (≅140 mm). The lengths p and q of the door lever 82 (first lever) shown in FIG. 5 are, respectively, ≅85 mm and ≅49 mm. The lengths s and t of the clamper hanger 62 (second lever) shown in FIG. 5 are, respectively, ≅51 mm and ≅12 mm. When the principle of the lever is applied, the ratio which the extent of the movement of the pin 81 of the door 80 bears to that of the disc clamper assembly 40 is expressed as:

$$q/p \times s/t = 49/85 \times 51/12 \cong 2.5$$

Now let it be assumed that the pin pivoting the door of the conventional disc apparatus is moved upward to the same extent as in the disc drive apparatus of the present invention. Then it will be seen from the above-mentioned value of the ratio that the disc clamper assembly 40 of the conventional disc drive apparatus shown in FIG. 1 is moved to an extent equal to 0.62 that of the above-mentioned upward movement of the door-pivoting pin, whereas the disc clamper assembly 40 of the present disc drive apparatus shown in FIG. 4 is moved to an extent equal to 2.5 times that of the afore-mentioned upward movement of the door-pivoting pin. The reason why the present invention has achieved such a favorable result is as follows.

Figure 2:
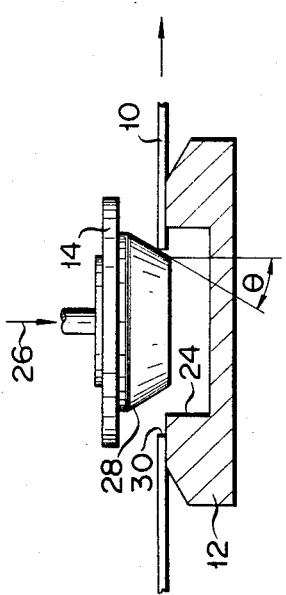
FIG. 2 is a front view of the disc clamper used with the disc drive apparatus of FIG. 1.

The conventional disc drive apparatus is so designed as to restrict the movement of a lever. In contrast, the disc drive apparatus of the present invention comprises a link mechanism 38 provided with two levers. One of the two levers restricts the movement of the door to an extent of 49/85≅0.58, whereas the other lever enlarges the restricted movement of one lever to an extent of 51/12≅4.3. Such an enlarged movement of the disc clamper assembly 40 offers the advantages that it is possible to reduce the inclination angle (corresponding to the angle θ of FIG. 2) of the conical section 44 of the clamper member 42 used to locate the disc 68, to prevent an excess force from being applied to said disc 68 and, consequently, to assure its precise centering. With the conventional disc drive apparatus, the lever extends along substantially the whole length of the apparatus, imposing limitations on the area in which other members are arranged. In contrast, the first and second levels of the disc drive apparatus of this invention extend from the door 80 to a point only a little beyond the center of the spindle 64, that is, the guide shaft 56. Therefore, a large space is left for use in a region defined between the guide shift 56 and the upper right side thereof indicated in FIG. 4. Consequently, the proper utilization of said space can contribute to the miniaturization of the disc drive apparatus. With the disc drive apparatus of the present invention, the inclined door lever 82 has about half the length of that of the conventional disc drive apparatus, and its vertical length can be more reduced than in the prior art.

Figure 3:
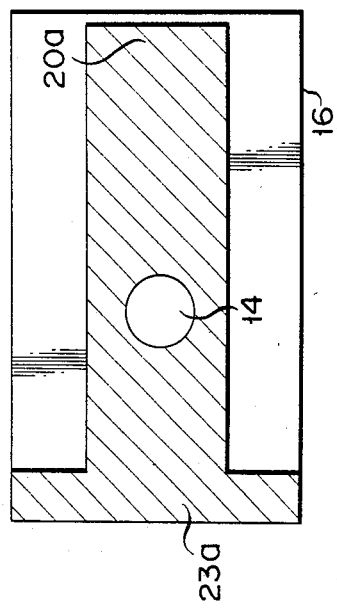
FIG. 3 is a plan view showing the approximate area occupied by the door and link mechanism.
Figure 7:
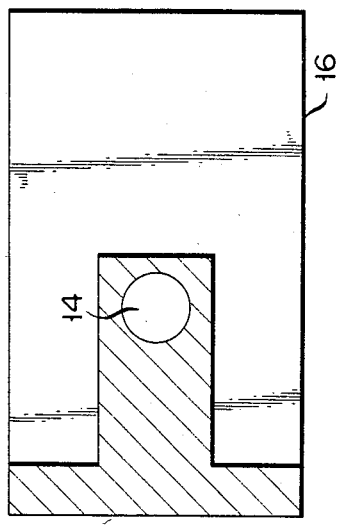
FIG. 7 is plan view showing an approximate area occupied by the door and link mechanism used with the magnetic disc drive apparatus of FIG. 4 as viewed from the top.

FIG. 7 is a hatched plan view of the area of the disc drive apparatus of FIG. 4 where the door and link mechanism are arranged, showing that said area is far smaller than in the conventional disc drive apparatus of FIG. 3.

With the disc drive apparatus of this invention, the disc clamper assembly 40 for holding the disc 68 is arranged concentrically with the spindle 64 to be moved axially therewith, offering the advantage of enabling the disc clamper assembly 40 to be smoothly engaged with the spindle 64.

What is claimed is:

1. A disc drive apparatus comprising:
   a housing having an opening at a front end thereof through which a disc can be inserted;
   a door rotatably supported by a horizontal shaft and movable between open and closed positions;
   spindle means for rotating said disc around a vertical axis substantially perpendicular to said horizontal axis;
   a disc clamper assembly means, rotatable about said vertical axis and movable along said vertical axis, for holding said disc between said disc clamper assembly and said spindle;
   link mechanism means for interlocking said door and disc clamper assembly and causing said disc clamper assembly to hold said disc between said spindle and disc clamper assembly responsive to said door being in said closed position, said link mechanism including a door lever having front and rear portions and a projection protruding downward from an intermediate portion thereof, and a clamper hanger having front and rear portions, the door lever being swingably fitted at its rear portion to a first portion of an upper wall of said housing in a vicinity of said disc clamper assembly, and connected at its front portion to the door by means of said horizontal shaft; and
   spring means for biasing, in an upward vertical direction, said door lever front portion, to always bring at least one upper edge portion of said door into contact with a second portion of said housing upper wall, whereby said door lever front portion is vertically moved by the opening/closing of said door,
   said clamper hanger being rotatably supported at its front portion with a horizontal shaft held by the housing at a position between said door and said door lever projection, and engaged at its rear end with the clamper hanger to vertically move said disc clamper assembly,
   said clamper hanger being engaged at an under side thereof with said door lever projection fixed to said door lever for pushing said clamper hanger in an upward vertical direction, whereby when the door is opened, said door lever front end moves upward and said clamper hanger is pushed upward by said projection, causing said clamper hanger rear end to move upward for releasing said disc clamped between a disc clamper assembly and said spindle.

* * * * *